United States Patent
Schmidt et al.

(10) Patent No.: US 11,175,618 B2
(45) Date of Patent: Nov. 16, 2021

(54) UNLOCKING CONSUMABLES FROM PRINTING DEVICES BASED ON COMPARISONS OF VALUES EXTRACTED FROM STORAGE DEVICES

(71) Applicant: HEWLETT-PACKARD DEVELOPMENT COMPANY, L.P., Spring, TX (US)

(72) Inventors: Wayne J. Schmidt, Boise, ID (US); Kent S. Takeshita, Boise, ID (US); Steve Beutler, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,059

(22) PCT Filed: Oct. 13, 2017

(86) PCT No.: PCT/US2017/056512
§ 371 (c)(1),
(2) Date: Oct. 9, 2019

(87) PCT Pub. No.: WO2019/074517
PCT Pub. Date: Apr. 18, 2019

(65) Prior Publication Data
US 2021/0103241 A1    Apr. 8, 2021

(51) Int. Cl.
*G03G 15/08* (2006.01)
*G03G 15/00* (2006.01)
*B33Y 50/00* (2015.01)
*B41J 2/175* (2006.01)

(52) U.S. Cl.
CPC ............ *G03G 15/553* (2013.01); *B33Y 50/00* (2014.12); *B41J 2/17546* (2013.01)

(58) Field of Classification Search
CPC .. G03G 15/553; G03G 21/04; G03G 21/1889; B33Y 50/00; B41J 2/17546
USPC ................................ 399/8, 12, 13, 24–27, 31
See application file for complete search history.

(56) References Cited

U.S. PATENT DOCUMENTS

| 5,508,795 | A |   | 4/1996 | Kikuchi |
| 5,579,088 | A | * | 11/1996 | Ko .......................... G03G 21/04 |
|   |   |   |   | 399/12 |
| 5,659,837 | A |   | 8/1997 | Jo |
| 6,685,290 | B1 |   | 2/2004 | Farr et al. |

(Continued)

FOREIGN PATENT DOCUMENTS

EP    3150384    4/2017

OTHER PUBLICATIONS

HP's New Firmware Locks Ink Cartridges, Mar. 6, 2015.

*Primary Examiner* — Hoan H Tran
(74) *Attorney, Agent, or Firm* — Tong Rea Bentley & Kim LLC (57) ABSTRACT

In an example, a method includes extracting a static value and a dynamic value from a computer readable storage device mounted on a consumable that is locked in a printing device. Based at least in part on a comparison of the static value to the dynamic value, it is determined that the consumable should be unlocked to facilitate removal of the consumable from the printing device. A signal is then sent to a drive mechanism with which the consumable is engaged. The signal instructs the drive mechanism to take an action that unlocks the consumable.

20 Claims, 9 Drawing Sheets

100

(56) References Cited

U.S. PATENT DOCUMENTS

| | | | |
|---|---|---|---|
| 6,768,877 B2 | 7/2004 | Alegria et al. | |
| 7,031,012 B1 * | 4/2006 | Serizawa | G03G 21/1889 347/214 |
| 7,399,047 B2 | 7/2008 | Ward et al. | |
| 7,434,053 B2 | 10/2008 | Parry et al. | |
| 9,285,753 B2 | 3/2016 | Hirama | |
| 9,361,466 B2 | 6/2016 | Ganesan et al. | |
| 2011/0286771 A1 | 11/2011 | Taguchi et al. | |
| 2017/0080717 A1 | 3/2017 | Nie et al. | |
| 2017/0094103 A1 | 3/2017 | Osadchyy | |

* cited by examiner

UNLOCKING CONSUMABLES FROM PRINTING DEVICES BASED ON COMPARISONS OF VALUES EXTRACTED FROM STORAGE DEVICES

BACKGROUND

Contractual service providers (CSPs) are businesses that may perform the repair, replacement, and/or maintenance of equipment and other property for a customer. In some cases, this may include the replacement of consumables used by the equipment. In the case of printing devices (e.g., commercial printers, additive manufacturing systems, and the like), these consumables may include items like ink and toner cartridges. For instance, the CSP may periodically provide the customer with full toner or ink cartridges as replacements for toner cartridges that are empty.

DETAILED DESCRIPTION

The present disclosure broadly describes an apparatus, method, and non-transitory computer-readable medium for locking a consumable in a printing device (e.g., an inkjet printer, a laserjet printer, an additive manufacturing system, or another type of two- or three-dimensional printing device). As discussed above, a contractual service provider (CSP) who is contracted to perform the repair, replacement, and maintenance of a printing device (e.g., a commercial printer, an additive manufacturing system, or the like), may periodically provide the customer with replacements for consumables used by the printing device, such as ink and toner cartridges. The customer may then replace a used consumable, such as a depleted powder, toner, or ink cartridge, with a new one.

Many printing devices will alert the customer when a consumable is close to depletion. For instance, a printing device may display an alert when a toner cartridge has reached some threshold level of depletion (e.g., ten percent toner remaining, one hundred pages remaining, etc.). However, if the customer replaces the consumable before it is fully depleted, valuable resources (e.g., remaining toner) may go unused, resulting in an artificial increase in the cost per page (CPP) and revenue loss to the CSP (who is typically paid some fixed contract price to provide replacement consumables).

Examples describe a key that is built into the drive mechanism of a printing device and a locking mechanism that is built into a mechanical drive coupling of a consumable of the printing device, such as an ink, powder, or toner cartridge. The key engages and disengages the locking mechanism, under control from cooperating firmware, to prevent the consumable from being removed from the printing device and/or replaced before it is depleted. This ensures that the maximum value (e.g., maximum number of pages printed) is extracted from the consumable before it is replaced, thereby maximizing the profit of a contractual service provider responsible for providing replacements. The key and locking mechanism can also be used to reduce the occurrence of fraud, as may be the case when a customer intentionally receives a partially depleted consumable.

One example of the key comprises a pin on the delivery auger drive mechanism of the drive mechanism of the printing device, while one example of the locking mechanism includes a ramp cut into the mechanical drive coupling on the consumable. When the consumable is inserted into the printing device, the ramp engages the pin. Rotation of the consumable's delivery auger (i.e., the mechanism on or inside the consumable that drives delivery of the consumable to the appropriate portions of the printing device) drives the pin down the ramp, until it comes to rest in a position that locks the consumable in place. Another example of the key comprises threads on the delivery auger drive mechanism of the printing device, while one example of the locking mechanism includes a mechanical drive coupling having a threaded aperture. When the consumable is inserted into the printing device, the threaded aperture engages the threads on the delivery auger drive mechanism. Rotation of the consumable's delivery auger increases the engagement of the threads, until the consumable is locked in place. After locking has occurred, additional rotation in the same direction will then serve to rotate the consumable's delivery auger, thus delivering a fresh supply of a consumable resource (e.g., toner, powder, or ink) to the printing system.

One example of the cooperating firmware may extract data from a storage device (e.g., a computer readable storage device, such as a read only memory and flash combination chip) that is mounted on the consumable and use this data to determine when the consumable should be locked and unlocked. For instance, the storage device may track data from which the depletion level of the consumable can be estimated. When the data indicates that the consumable has reached a threshold level of depletion, the cooperating firmware may send a signal to the delivery auger drive mechanism with which the consumable is engaged, instructing the delivery auger drive mechanism to take an action (e.g., counter clockwise rotation) that will unlock the consumable and facilitate its removal from the printing device.

In further examples, the cooperating firmware ensures that use of the consumable in the printing device is consistent with a user- (e.g., customer, CSP, or manufacturer) specific policy or security procedure. For instance, a customer-specific policy may specify that the consumable may not be replaced until it is at least x percent depleted, that a consumable may not be installed unless it is manufactured by a specific source, or that access to the consumable is restricted to specific intervals of time. The cooperating firmware may send a signal to the delivery auger drive mechanism with which the consumable is engaged, instructing the delivery auger drive mechanism to take an action (e.g., clockwise rotation, counter clockwise rotation, etc.) that is consistent with the customer-specific policy (e.g., unlock the consumable, lock the consumable, etc.).

Although examples of the present disclosure are described within the context of a consumable that is a toner cartridge, such examples may be equally applicable to other types of consumables, such as ink cartridges, detailing agent cartridges, powder cartridges, imaging units or drums, developer units, fuser units, intermediate transfer belts (ITBs), ITB cleaners, and the like.

Figure 1A:
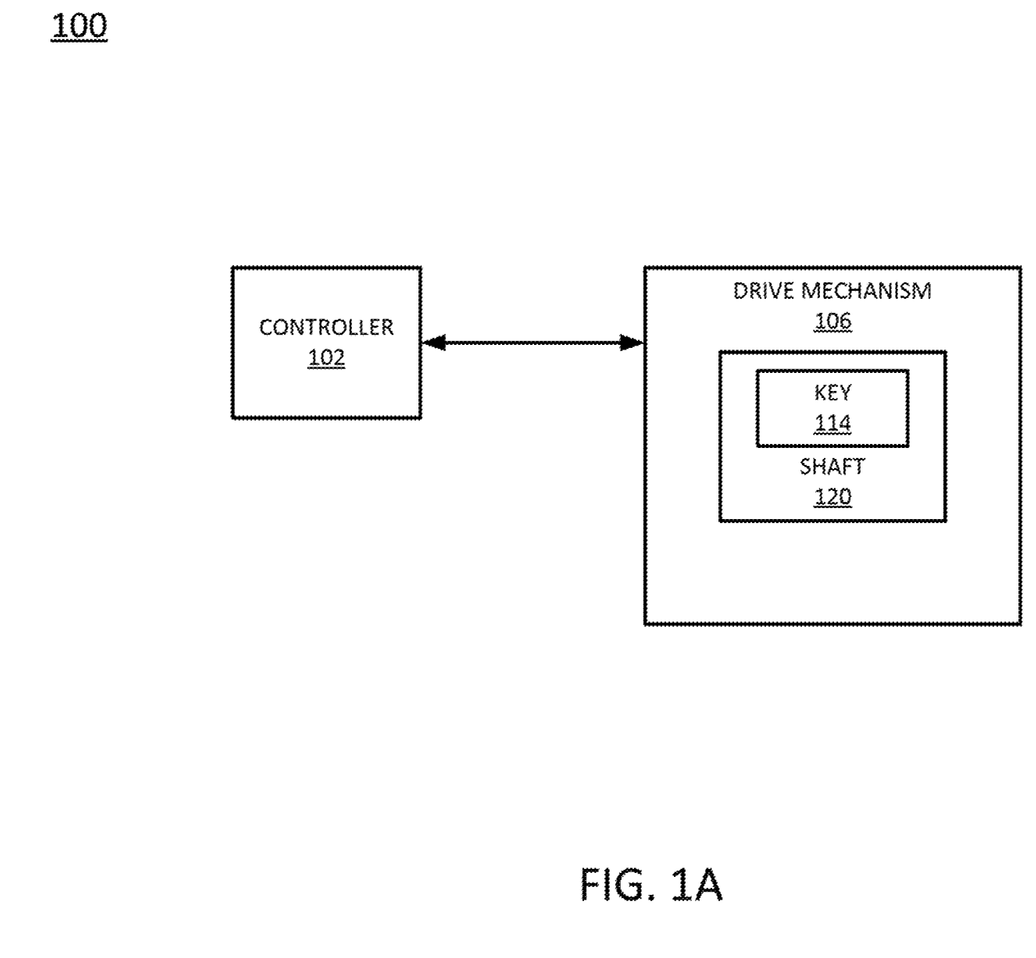
FIG. 1A is a high-level block diagram illustrating an example system for locking a consumable in a printing device.

FIG. 1A is a high-level block diagram illustrating an example system 100 for locking a consumable in a printing device. As such, the system 100 may comprise a sub-system of a printing device. As illustrated, the system 100 generally comprises a controller 102 and a drive mechanism 106.

The controller 102 may comprise a microcontroller or computing device, e.g., as illustrated in and described in greater detail with reference to FIG. 7. The controller 102 may monitor the states of the drive mechanism 106 and of a consumable driven by the drive mechanism, and may send instructions to the drive mechanism 106 via electronic signals to facilitate locking and/or unlocking of the consumable. One example of a method for locking and unlocking a consumable is illustrated in and described in greater detail with reference to FIG. 5.

The drive mechanism 106 comprises a device for driving a consumable and may be part of a delivery auger drive mechanism that drives a delivery auger on or inside the consumable. Thus, the drive mechanism 106 may engage the consumable, under instructions from the controller 102, to facilitate installation of the consumable and extraction of a resource (e.g., toner, ink, detailing agent, or the like), when appropriate, from the consumable. To this end, the drive mechanism 106 may comprise a shaft 120 and a key 114 which is integrated into the shaft 120. The key 114 may comprise a physical feature of the drive mechanism 106 that allows the drive mechanism 106 to lock and unlock the consumable in the printing device, under instructions from the controller 102. Examples of keys are illustrated in and described in greater detail with respect to FIGS. 2A-2D and 3A-3C.

Figure 1B:
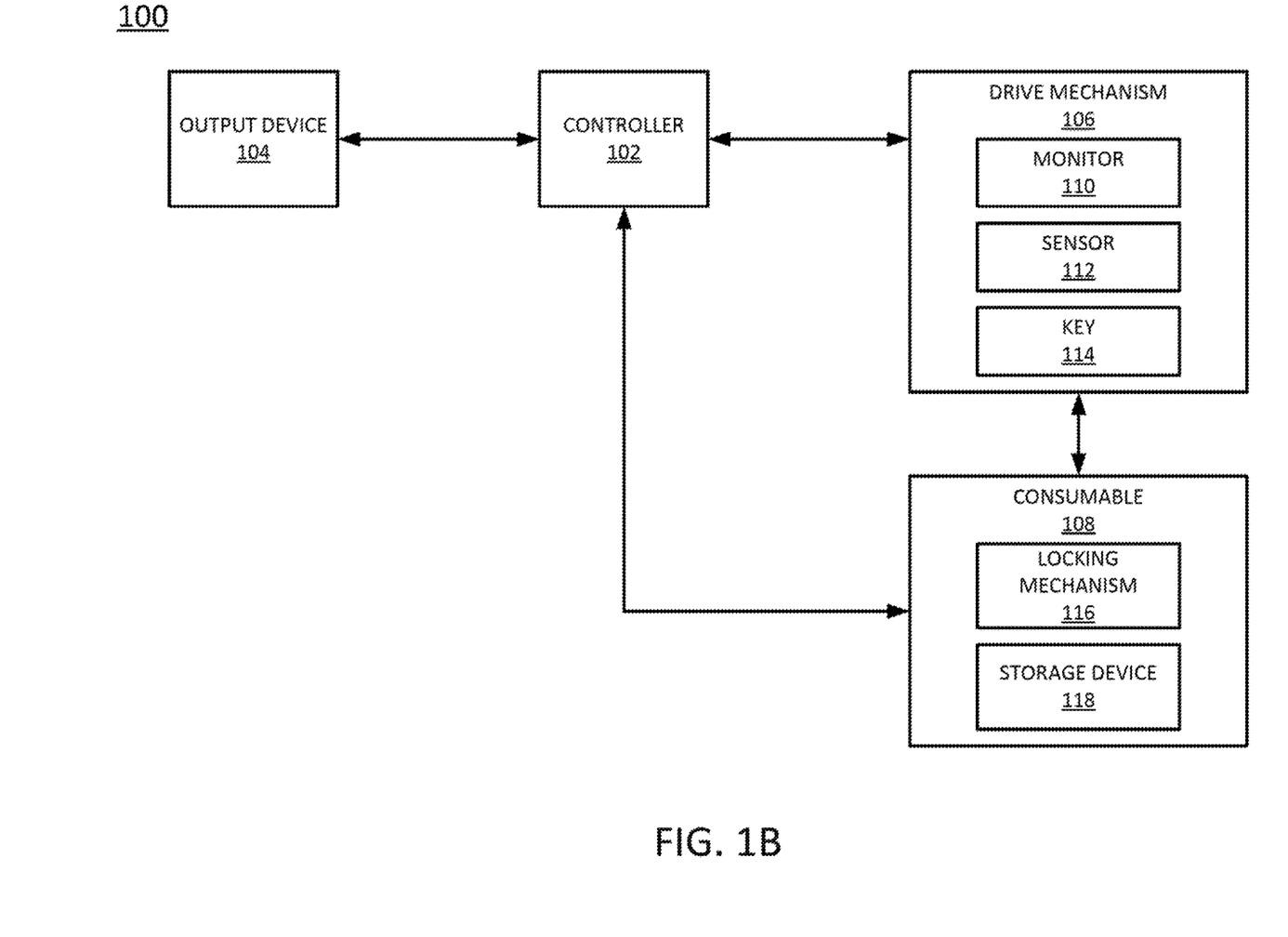
FIG. 1B is a high-level block diagram illustrating a more detailed depiction of the example system of FIG. 1A.

FIG. 1B is a high-level block diagram illustrating a more detailed depiction of the example system 100 of FIG. 1A. As discussed above, the system 100 may comprise a sub-system of a printing device. As illustrated, the system 100 generally comprises a controller 102, an output device 104, a drive mechanism 106, and a consumable 108. The controller 102, output device 104, and drive mechanism 106 may be permanent components of the printing device (i.e., where "permanent" does not imply that the components might not be subject to occasional replacement or repair), while the consumable 108 may be a component that is replaced with a similar component when it reaches at least a threshold level of depletion.

As discussed above, the controller 102 may comprise a microcontroller or computing device, e.g., as illustrated in and described in greater detail with reference to FIG. 7. The controller 102 may monitor the states of the output device 104, the drive mechanism 106, and/or the consumable 108 and send instructions to any of these components via electronic signals to facilitate locking and/or unlocking of the consumable 108. One example of a method for locking and unlocking a consumable such as the consumable 108 is illustrated in and described in greater detail with reference to FIG. 5.

The output device 104 comprises a device through which the controller 102 may provide feedback or alerts to a printing device user, e.g., when the consumable 108 reaches a threshold level of depletion and is to be replaced. The controller 102 may also provide, via the output device 104, instructions for replacing the consumable (e.g., which door or panel of the printing device to open, which make or model of consumable to provide as a replacement, etc.). Thus, the output device 104 may comprise any one or more of a display (to provide a visual alert, such as text or images), a speaker (to provide an audible alert, such as a tone, a beep, or the like), or an indicator light (to provide a visual alert, such as a lit indicator).

As discussed above, the drive mechanism 106 comprises a device for driving the consumable 108. Thus, the drive mechanism 106 may engage the consumable 108, under instructions from the controller 102, to facilitate installation of the consumable 108 and extraction of a resource (e.g., toner, ink, detailing agent, or the like), when appropriate, from the consumable 108. To this end, the drive mechanism 106 may comprise a motor 110, a sensor 112, and a key 114. The motor 110 may move components of the drive mechanism 106, such as a delivery auger drive mechanism to which the key 114 is attached, to facilitate locking and/or unlocking of the consumable 108, as well as extraction of the resource from the consumable. The sensor 112 may detect the state of engagement between the drive mechanism 106 and the consumable 108 (e.g., partially engaged, fully engaged, etc.) and may send electronic signals to the controller 102 to notify the controller 102 of the state of engagement. In another example, the state of engagement between the drive mechanism 106 and the consumable 108 may be detected passively, e.g., without the use of the sensor 112. The key 114 may comprise a physical feature of the drive mechanism 106 (e.g., of a delivery auger drive mechanism of the drive mechanism 106) that allows the drive mechanism 106 to lock and unlock the consumable 108 in the printing device, under instructions from the controller 102. Examples of keys are illustrated in and described in greater detail with respect to FIGS. 2A-2D and 3A-3C.

The consumable 108 comprises any component of the printing device that contains some finite amount of a resource used by the printing device, and may therefore be subject to periodic replacement during the life of the printing device. For instance, the consumable 108 may comprise a toner cartridge, a powder cartridge, an ink cartridge, a detailing agent cartridge, an imaging unit, a developer unit, a fuser unit, an intermediate transfer belt (ITB), an ITB cleaner, or the like. The consumable 108 may comprise, in addition to the finite amount of the resource, a locking mechanism 116 and a storage device 118. The locking mechanism 116 comprises a physical feature of the consumable 108 that engages the key 114 of the drive mechanism 106 and allows the consumable 108 to be locked and unlocked in the printing device. Examples of locking mechanisms are illustrated in and described in greater detail with respect to FIGS. 2A-2D and 3A-3C. The storage device 118 comprises a computer readable storage device, such as a chip (e.g., read only memory and flash combination chip) that tracks usage statistics for the consumable 108, such as the consumable's level of depletion, the consumable's remaining life, the veracity of the consumable's origin, the number of times consumable 108 has been inserted in a printing device, the number of pages printed using the consumable 108, level of depletion the last time the consumable 108 was removed from a printing device (e.g., if the consumable 108 is reusable), and/or other statistics. An example of a storage device is illustrated in and described in greater detail with respect to FIG. 4.

FIGS. 2A-2D depict an example of a locking mechanism 200 for locking a consumable in a printing device. In this example, physical modifications are made to the delivery auger drive mechanism inside the printing device and to the mechanical drive coupling on the consumable that directly engages the delivery auger drive mechanism. The physical modifications allow the consumable to be locked in place when the mechanical drive coupling engages the delivery auger drive mechanism.

Figure 2A:
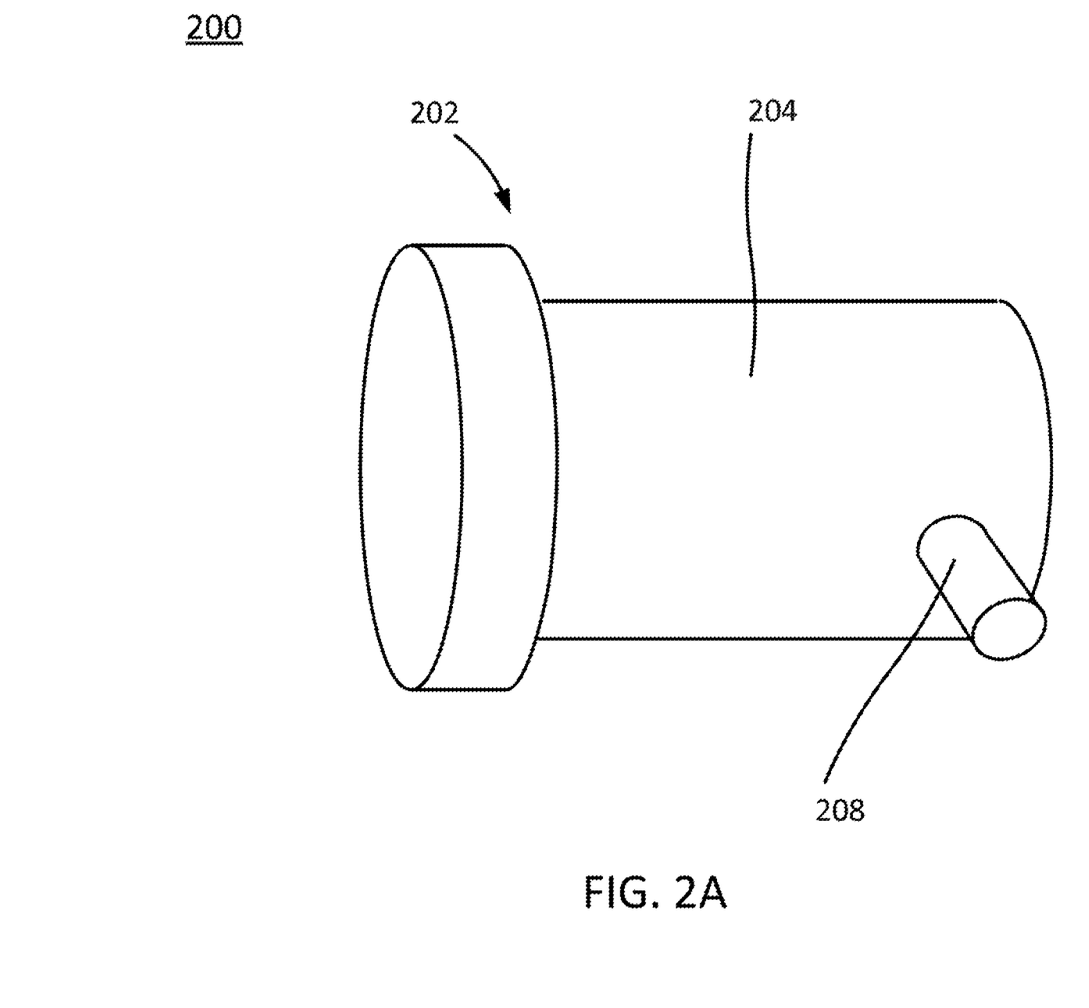
FIGS. 2A-2D depict an example of a locking mechanism for locking a consumable in a printing device.

As illustrated in FIG. 2A, the delivery auger drive mechanism 202 comprises a shaft 204 having a substantially cylindrical shape. A key, in this case a pin 208, protrudes from the circumference of the shaft 204, near one end of the shaft 204. The pin 208 may also have a cylindrical shape, and the diameter of the pin 208 may be smaller than a diameter of the shaft 204. However, in other examples, the pin 208 may have a different shape (e.g., a bump, a series of cuts, etc.). The key may also comprise a plurality of pins, e.g., extending from different sides of the shaft 204.

Figure 2B:
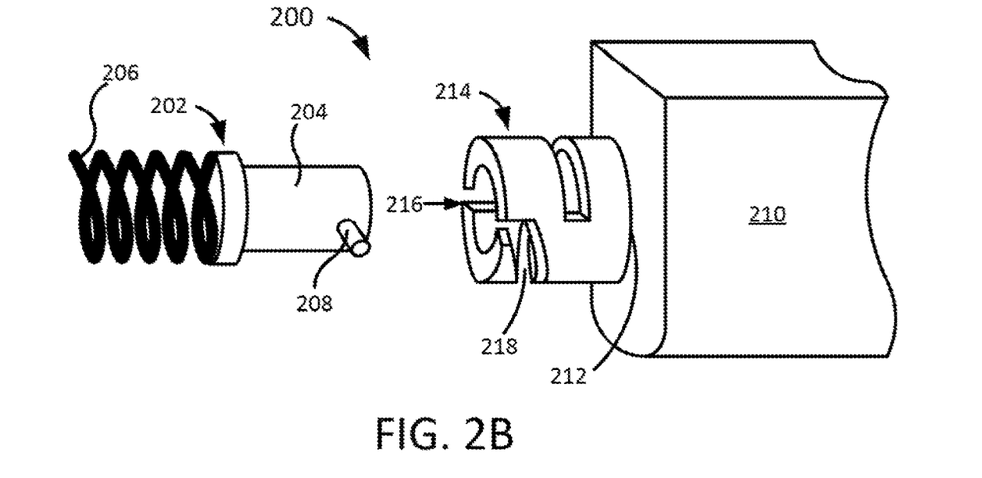

As illustrated in FIG. 2B, which shows a more detailed depiction of the locking mechanism 200 of FIG. 2A and how the locking mechanism 200 engages a consumable, a first end of the shaft 204 may be coupled to the printing device via a spring 206. Meanwhile, the pin 208 may protrude from the circumference of the shaft 204, near a second end of the shaft 204.

In FIG. 2B, the consumable is depicted as a cartridge, although other types of consumables may be adapted in a similar manner. The cartridge includes a container 210 for holding a quantity of a consumable resource (e.g., toner, powder, or ink), and the container 210 includes an aperture 212 through which the delivery auger drive mechanism 202 may reach to engage a delivery auger inside the container 210. In addition, a mechanical drive coupling 214 is attached to the aperture 212. The mechanical drive coupling 214 includes a bore 216 and a locking mechanism integrated into the bore 216 for engaging the delivery auger drive mechanism 202. In the example illustrated in FIG. 2B, the locking mechanism comprises a ramp 218. The ramp 218 may be formed by cutting a spiral-shaped path into the cylindrical mechanical drive coupling 214, as illustrated in FIG. 2B.

Figure 2C:
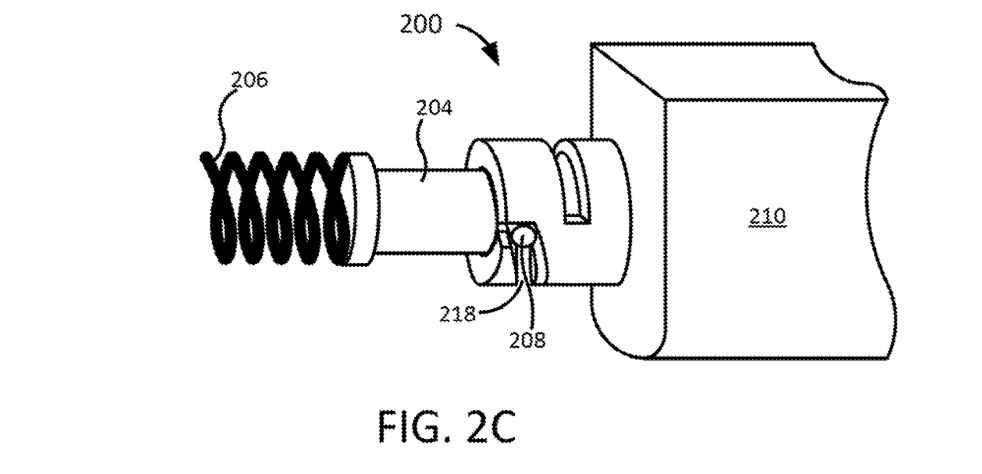

As illustrated in FIG. 2C, when the cartridge is inserted into the printing device, the mechanical drive coupling 214 on the container 210 engages the shaft 204 of the delivery auger drive mechanism 202. In particular, the cartridge is inserted so that the pin 208 on the shaft 204 is positioned at a starting position of the ramp 218 on the mechanical drive coupling 214, as shown in FIG. 2C.

Figure 2D:
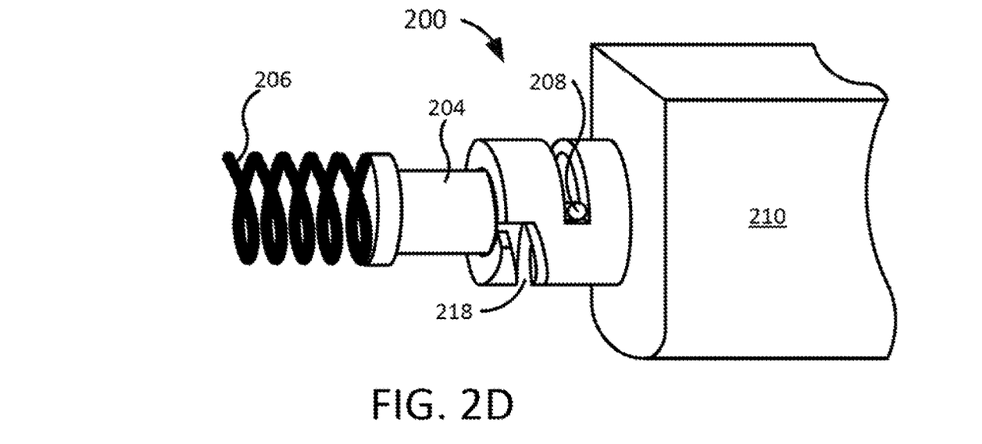

As illustrated in FIG. 2D, the delivery auger drive mechanism 202 is then rotated (e.g., by a motor, not shown) in a first direction (e.g., clockwise), so that the pin 208 on the shaft 204 travels along the ramp 218 to an ending position. This pulls the cartridge into the printing device and locks the cartridge in place, e.g., the cartridge cannot be easily disengaged from the delivery auger drive mechanism 202 by manually pulling the cartridge away (e.g., in a linear direction). After locking has occurred, additional rotation in the same direction will serve to rotate the consumable's internal delivery auger, thus delivery a fresh supply of the consumable resource stored in the container 210 to the printing device.

To unlock the cartridge, the delivery auger drive mechanism 202 is rotated in a second direction opposite the first direction (e.g., counterclockwise). As a result, the pin 208 of the shaft 204 will travel in the reverse direction along the ramp 218, i.e., from the ending position of the ramp 218 to the starting position. The cartridge can then be manually removed from the delivery auger drive mechanism 202 by pulling in a direction away from the delivery auger drive mechanism 202 (e.g., in a linear direction). The spring 206 of the delivery auger drive mechanism 202 may be biased so that it forces the cartridge some distance out of its install location. This may make it easier for a customer to locate the cartridge that is to be replaced, which is a further advantage of the present disclosure, as customers may have difficulty in identifying cartridges that are ready for replacement.

Thus, the locking mechanism 200 illustrated in FIGS. 2A-2D makes modifications to the existing delivery components (e.g., delivery auger drive mechanisms and mechanical drive couplings) for driving a consumable of a printing device. By modifying the configurations of the delivery auger drive mechanism 202 and the mechanical drive coupling 214 as described above, a reversible lock can be created while minimizing increases in hardware costs. System reliability can also be improved through the minimization of additional components, drives, and potential failure points.

Figure 3A:
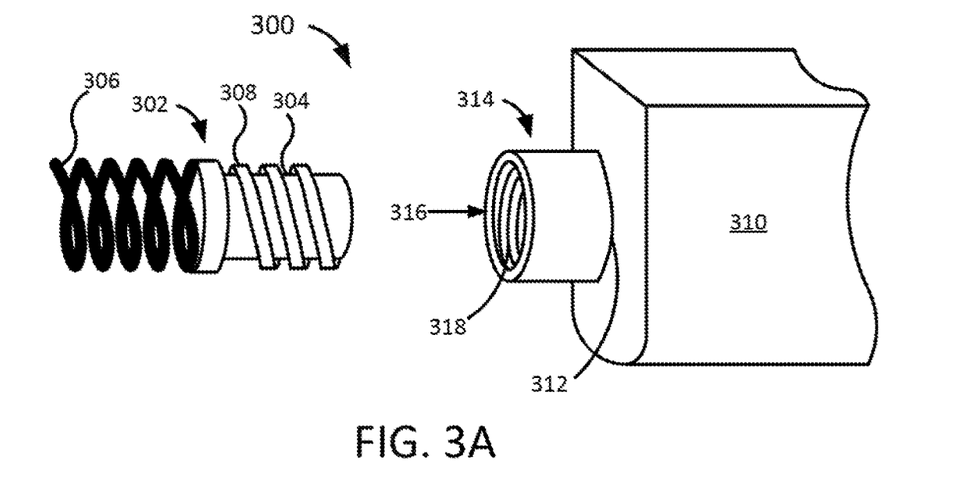
FIGS. 3A-3C depict an example of a locking mechanism for locking a consumable in a printing device.
Figure 3B:
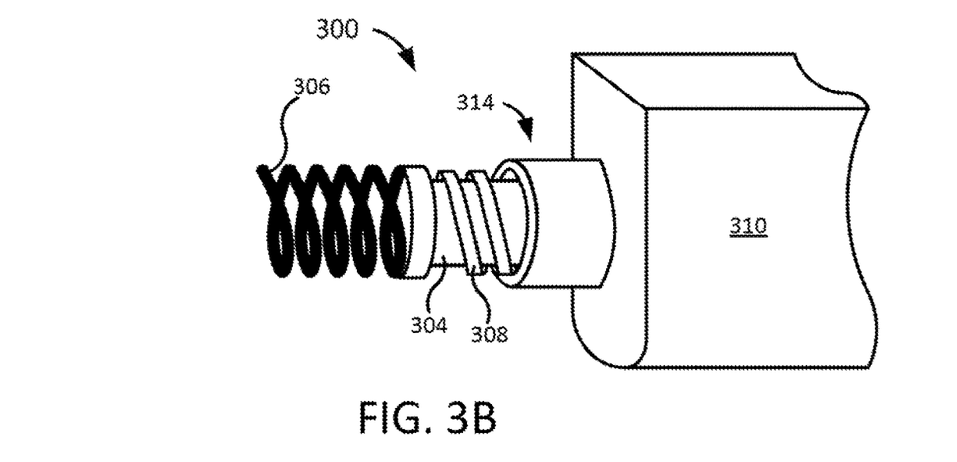
Figure 3C:
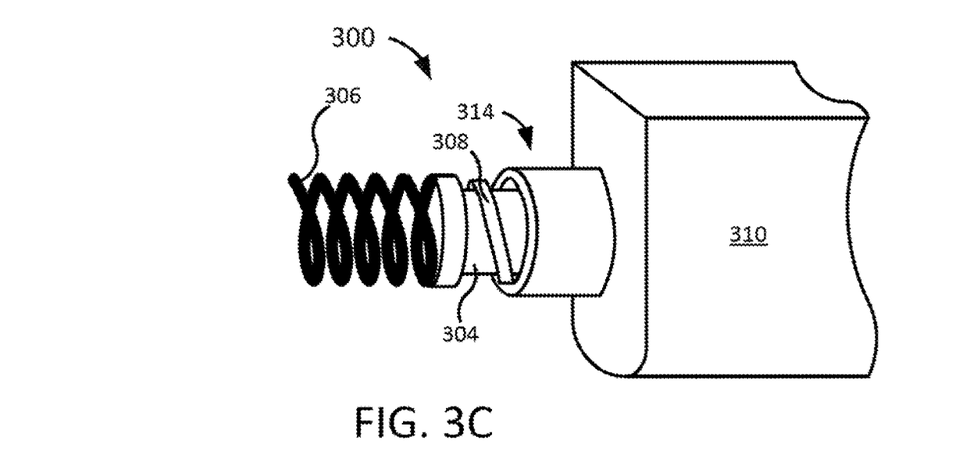

FIGS. 3A-3C depict an example of a locking mechanism 300 for locking a consumable in a printing device. As in the example illustrated in FIGS. 2A-2D, physical modifications are made to the delivery auger drive mechanism inside the printing device and to the mechanical drive coupling on the consumable that directly engages the delivery auger drive mechanism. The physical modifications allow the consumable to be locked in place when the mechanical drive coupling engages the delivery auger drive mechanism.

As illustrated in FIG. 3A, the delivery auger drive mechanism 302 comprises a shaft 304 having a substantially cylindrical shape. The shaft 304 in this example includes a key that is threaded, i.e., threads 308 function as the key and extend along most of the length of the shaft 304 so that the shaft 304 resembles a screw. A first end of the shaft 304 is coupled to the printing device via a spring 306.

In FIG. 3A, the consumable is depicted as a cartridge, although other types of consumables may be adapted in a similar manner. The cartridge includes a container 310 for holding a quantity of a consumable resource (e.g., toner, powder, or ink), and the container 310 includes an aperture 312 through which the delivery auger drive mechanism 302 may reach to engage a delivery auger inside the container 310. In addition, a mechanical drive coupling 314 is attached to the aperture 312. The mechanical drive coupling 314 includes a bore 316 and a locking mechanism integrated into the bore 316 for engaging the delivery auger drive mechanism 302. In the example illustrated in FIG. 3A, the locking mechanism comprises a threads 318 formed inside the bore 316.

As illustrated in FIG. 3B, when the cartridge is inserted into the printing device, the mechanical drive coupling 314 on the container 310 engages the shaft 304 of the delivery auger drive mechanism 302. In particular, the cartridge is inserted so that the threads 308 on the shaft 204 engage the threads 318 on the inside of the bore 316, as shown in FIG. 3B.

As illustrated in FIG. 3C, the delivery auger drive mechanism 302 is then rotated (e.g., by a motor, not shown) in a first direction (e.g., clockwise), so that the engagement of the threads 308 on the shaft 304 and the threads 318 inside the bore 316 pulls the shaft 304 through the bore 316. This, in turn, pulls the cartridge into the printing device and locks the cartridge in place, e.g., the cartridge cannot be easily disengaged from the delivery auger drive mechanism 302 by manually pulling the cartridge away (e.g., in a linear direction). After locking has occurred, additional rotation in the same direction will serve to rotate the consumable's internal delivery auger, thus delivery a fresh supply of the consumable resource stored in the container 310 to the printing device.

To unlock the cartridge, the delivery auger drive mechanism 302 is rotated in a second direction opposite the first direction (e.g., counterclockwise). As a result, the engagement of the threads 308 on the shaft 304 and the threads 318 inside the bore 316 is reduced. The cartridge can then be manually removed from the delivery auger drive mechanism 302 by pulling in a direction away from the delivery auger drive mechanism 302. The spring 306 of the delivery auger drive mechanism 302 may be biased so that it forces the cartridge some distance out of its install location. This may make it easier for a customer to locate the cartridge that is to be replaced, which is a further advantage of the present disclosure, as customers may have difficulty in identifying cartridges that are ready for replacement.

Thus, FIGS. 2A-2D and 3A-3C illustrate two specific examples of modifications that can be made to a consumable and/or drive mechanism to facilitate locking of the consumable in a printing device. Further and other modifications can be made to the drive mechanism and/or consumable to accomplish a similar result. For instance, a magnetic latch on the drive mechanism and/or consumable could be exposed by relative rotation of the drive mechanism and consumable. In some examples, a manual release may be built into the drive mechanism and/or consumable to allow the consumable to be unlocked for service in the event of a controller fault. For instance, in one example, a display of the printing device may present service personnel with a menu that is accessible by password (or by some other means of security) that includes an option to override the lock.

Moreover, by varying the mechanisms used for the locking mechanisms and keys (e.g., a ramp and pin as in FIGS. 2A-2D, a threaded bore and threaded shaft as in FIGS. 3A-3C, or other mechanisms) or by varying the sizes and shapes of the mechanisms, the locking mechanism disclosed herein may also serve as a mechanical means of keying consumables for particular products, generations, regions, or the like. For instance, configuring the delivery auger drive mechanism of a printing device with a particular type of key (e.g., with a pin) would ensure that consumables having incompatible locking mechanisms (e.g., no ramp) could not be easily installed in the printing device.

Figure 4:
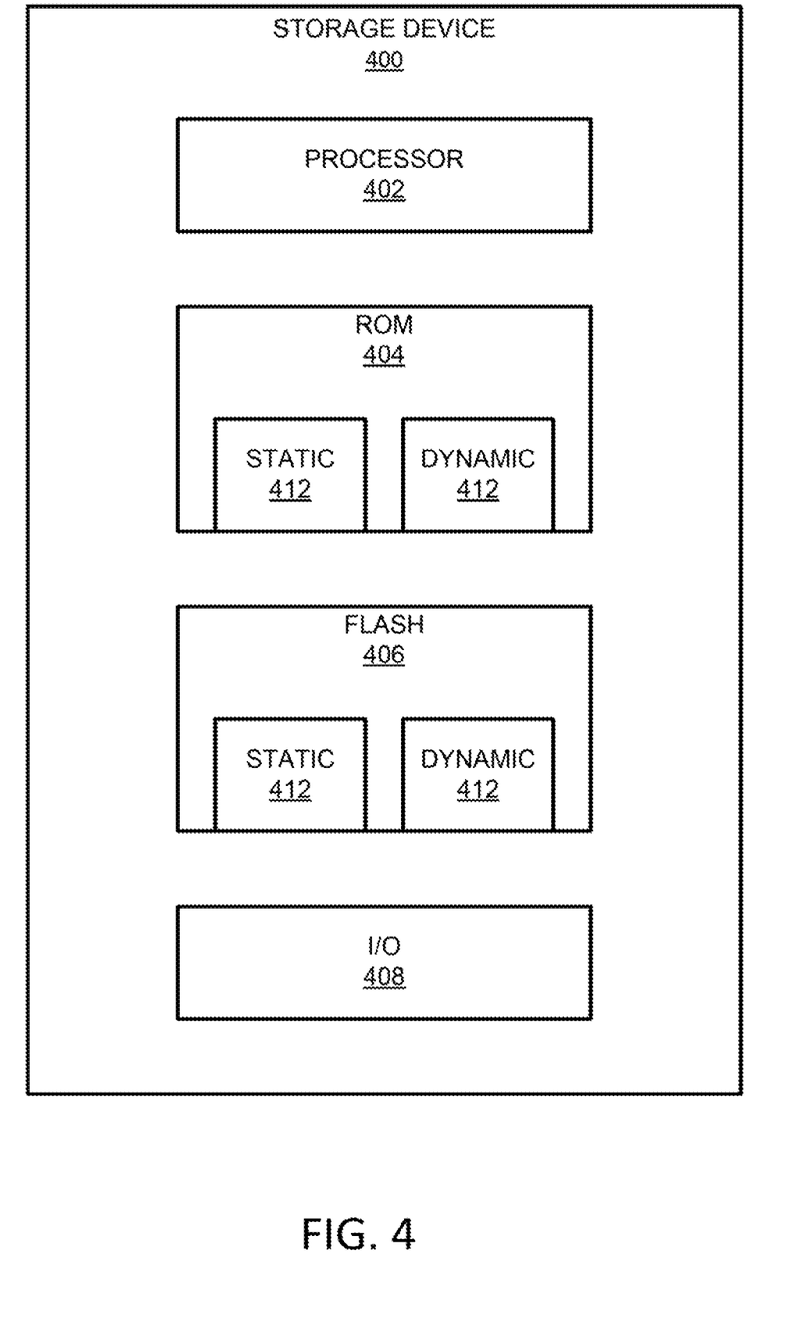
FIG. 4 depicts an example of a storage device such as may be mounted to a consumable in a printing device.

FIG. 4 depicts an example of a storage device 400 such as may be mounted to a consumable in a printing device. For instance, the storage device may be integrated into the consumables illustrated in FIGS. 2A-2D and 3A-3C.

As illustrated, the storage device 400 generally comprises a processor 402, at least one memory, e.g., a read only memory (ROM) 404 and a flash memory 406, and an I/O device 408.

The processor 402 may comprise a microprocessor or central processing unit (CPU). The processor 402 may read values from and write values to the ROM 402 and/or the flash memory 404, as discussed in greater detail below.

Although both ROM and flash memory are considered to be non-volatile, the at least one memory may also include volatile memory as well. Either or both of the ROM 404 and the flash memory 406 may be used to store a plurality of values related to the consumable on which the storage device 400 is mounted. In one example, this plurality of values includes both a static value 410 and a dynamic value 412. In one example, the static value 410 comprises a value that relates to a security policy or contract attached to the consumable. For instance, the static value 410 may define a threshold level of depletion that the consumable should reach before it is unlocked, a range of times during which the consumable may be unlocked, or another value. In one example, the dynamic value 412 comprises a value that relates to a current state of the consumable. For instance, the dynamic value 412 may define usage statistics for the consumable, such as the consumable's current level of depletion, the consumable's remaining life, the veracity of the consumable's origin, the number of times consumable has been inserted in a printing device, the number of pages printed using the consumable, level of depletion the last time the consumable was removed from a printing device (e.g., if the consumable is reusable), and/or other statistics. However, in further examples, the value relating to the security policy (e.g., a threshold level of depletion) could be a dynamic value that is determined using a learning algorithm.

The I/O devices 408 comprise devices that allow the storage device to communicate the static value 410 and the dynamic value 412 to a controller of a printing device in which the consumable is installed, such as the controller 102 of FIG. 1. For instance, the I/O devices 408 may comprise a first set of contacts that can engage a second set of contacts electrically connected to the controller, and thereby transmit the static value 410 and/or the dynamic value 412 as an electrical current having a particular contact resistance. As discussed in greater detail with respect to FIG. 5, the controller may compare the static value 410 and the dynamic value 412 obtained from the storage device in order to determine when the consumable should be locked or unlocked.

Figure 5:
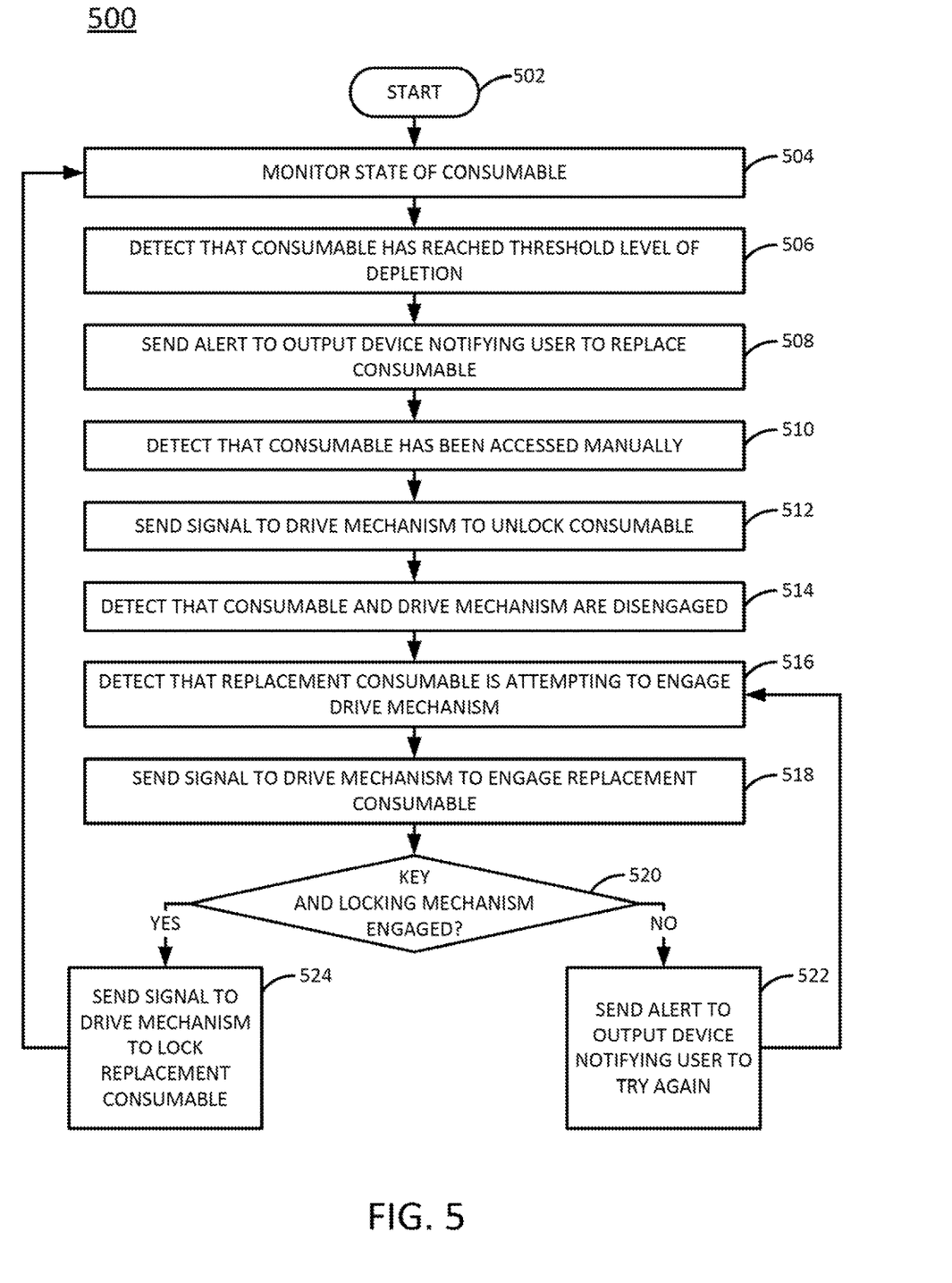
FIG. 5 illustrates a flow diagram of an example method for installing a consumable in a printing device.

FIG. 5 illustrates a flow diagram of an example method 500 for installing a consumable in a printing device. The method 500 may be performed, for example, by the controller 102 configured as illustrated in FIG. 1. As such, reference may be made in the discussion of the method 400 to a controller; however, such references are made for the sake of example, and are not intended to be limiting.

The method 500 begins in block 502. In block 504, the controller monitors the state of a consumable that is in use by the printing device. In one example, the controller may monitor the state of the consumable by extracting a dynamic value from a storage device (e.g., a read only memory and flash combination chip) that is mounted to the consumable. The dynamic value may comprise usage statistics for the consumable, such as the consumable's current level of depletion, the consumable's remaining life, the veracity of the consumable's origin, the number of times consumable has been inserted in a printing device, the number of pages printed using the consumable, level of depletion the last time the consumable was removed from a printing device (e.g., if the consumable is reusable), and/or other statistics.

In block 506, the controller detects that the monitored consumable has reached some threshold level of depletion (e.g., x percent depleted). This determination may be based, for example, on a comparison of the dynamic value obtained in block 502 to a static value that is also obtained from the storage device mounted on the consumable. The static value may specify what the threshold level of depletion is for this particular consumable. In one example, the threshold level of depletion is configurable and may be customized to fit a user's (e.g., a customer's, a manufacturer's, or a CSP's) preferences. In this way, the security policies or procedures for the consumable, as discussed in greater detail below, may be unique for each consumable and/or user rather than generic.

In block 508, the controller sends an alert to an output device of the printing device (e.g., a display, a speaker, or the like) to notify a user that the consumable should be replaced. For instance, the alert may comprise a message displayed on a display of the printing device, the lighting of an indicator on the printing device, or an audible tone played through a speaker of the printing device. In a further example, the controller may send a message over a network to a communications device associated with the user, such as a mobile phone, a computing device, a wearable smart device, or the like. The controller may also send the message to a CSP or other party for automatic ordering of a replacement consumable. The controller may also write a value to a storage device (e.g., a read only memory and flash combination chip) mounted on the consumable, if there is one. For instance, the value written to the storage device may indicate the detected level of depletion of the consumable at the time that the alert is sent to replace the consumable.

In block 510, the controller detects that the consumable (or a section of the printing device housing the consumable) has been accessed manually, presumably by the user. For instance, the controller may detect that a door or a panel concealing the consumable has been opened. In this caser, a sensor in the door or panel may transmit a signal to the controller indicating that it has been opened.

In block 512, the controller sends a signal to the delivery auger drive mechanism with which the consumable is engaged to unlock the consumable. In one example, as discussed above in connection with FIGS. 2A-2D and 3A-3C, the signal may instruct the delivery auger drive mechanism to rotate in a particular direction (e.g., clockwise or counter-clockwise) so that the locking mechanism integrated into the consumable is released by the key of the delivery auger drive mechanism. The signal may further instruct the delivery auger drive mechanism to release a bias applied to a biasing element (e.g., a spring, as described in connection with FIGS. 2A-2D and 3A-3C), so that the consumable is forced some distance out of its install location, allowing the user to more easily identify the consumable to be replaced.

In block 514, the controller detects that the consumable has been disengaged from the delivery auger drive mechanism. In one example, a sensor in the drive mechanism may send a signal to the controller indicating that the delivery auger drive mechanism is fully disengaged from the locking mechanism on the consumable.

In block 516, the controller may detect that a replacement consumable is attempting to engage the delivery auger drive mechanism. In one example, a sensor in the drive mechanism may send a signal to the controller indicating that the delivery auger drive mechanism has come into contact with the replacement consumable.

In block 518, the controller sends a signal to the delivery auger drive mechanism to engage the replacement consumable. In one example, as discussed above in connection with FIGS. 2A-2D and 3A-3C, the signal may instruct the delivery auger drive mechanism to rotate in a particular direction (e.g., clockwise or counter-clockwise) so that the locking mechanism integrated into the consumable is engaged by the key of the delivery auger drive mechanism.

In block 520, the controller determines whether the key of the delivery auger drive mechanism and the locking mechanism of the replacement consumable are engaged (e.g., as illustrated in FIGS. 2C and 3B above). In one example, a sensor in the drive mechanism may send a signal to the controller indicating that the key of the delivery auger drive mechanism has engaged the locking mechanism on the replacement consumable (e.g., as illustrated in FIGS. 2D and 3C above). The key of the delivery auger drive mechanism and the locking mechanism of the replacement consumable may not be fully engaged at this point, but may be at least partially engaged (e.g., enough to determine whether the key of the delivery auger drive mechanism is compatible with the locking mechanism on the consumable).

If the controller determines in block 520 that the key of the delivery auger drive mechanism and the locking mechanism of the replacement consumable are not engaged, then method 500 proceeds to block 522. In block 522, the controller sends an alert to the output device of the printing device (e.g., a display, a speaker, or the like) to notify the user to try again. For instance, the user may have failed to align the locking mechanism on the replacement consumable properly with the key of the delivery auger drive mechanism. Alternatively, the locking mechanism on the consumable may not be compatible with the key of the delivery auger drive mechanism (e.g., as may be the case when the user attempts to install the wrong type of toner cartridge). The method 500 then returns to block 516.

If, on the other hand, the controller determines in block 520 that the key of the delivery auger drive mechanism and the locking mechanism of the replacement consumable are engaged, then method 500 proceeds to block 524. In block 524, the controller sends a signal to the delivery auger drive mechanism to lock the replacement consumable in place, e.g., by fully engaging the locking mechanism on the replacement consumable (e.g., as illustrated in FIGS. 2D and 3C above). Once locked, the replacement consumable will not be able to be easily removed from the printing device unless it is unlocked by the controller (e.g., similar to the manner in which the depleted consumable was unlocked in block 512).

The method 500 then returns to block 504 and continues to monitor the state of the replacement consumable in the manner described (e.g., potentially with respect to new static and/or dynamic values stored in the storage device of the replacement consumable). For instance, the controller may extract new static and/or dynamic values from a storage device mounted on the replacement consumable (e.g., defining security policies and/or usage statistics for the consumable, such as the consumable's level of depletion, the consumable's remaining life, the veracity of the consumable's origin, the number of times consumable has been inserted in a printing device, the number of pages printed using the consumable, level of depletion the last time the consumable was removed from a printing device (e.g., if the consumable is reusable), and/or other statistics).

Thus, the method 500 makes it more difficult for consumables to be replaced before they have reached some threshold level of depletion, thereby maximizing the usefulness of the consumable. The method 500 may also be used to prevent unauthorized replacement consumables from being installed in the printing device. Moreover, by monitoring the static and dynamic values stored in a storage device mounted on the consumable, and by updating these values when appropriate, a measure of confidence may be provided as to the consumable being replaced at the appropriate time. This will help refine the accuracy of the controller's operations with respect to consumables that are installed in the future. This may also help to detect problems with particular types (e.g., models) of consumables, for instance if a trend is detected in the data stored in the storage devices mounted on multiple consumables of the same type.

As discussed above, the method 500 (potentially in combination with various configurations of the locking mechanism described above) may also make it possible for user- (e.g., customer, CSP, or manufacturer) specific policies or security procedures to be defined and enforced. For instance, the controller could be programmed to enforce a consumable replacement policy that does not allow a consumable to be unlocked until it has reached at least a threshold level or depletion. Thus, the controller of Customer A's printing device may be configured to allow unlocking of a consumable when it reaches at least ninety percent depletion, while the controller of Customer B's printing device may be configured to allow unlocking of a consumable when it reaches one hundred percent depletion.

Similarly, the controller could be configured to limit user access to consumables (e.g., consumables may be unlocked by certain people), to define consumable replacement intervals (consumables may be replaced after a certain period of time, or during a certain window of time), or to define the types of consumables (e.g., makes, models, batches) that may be installed in the printing device. Thus, security procedures can be customized to address the concerns of a particular printing environment.

Figure 6:
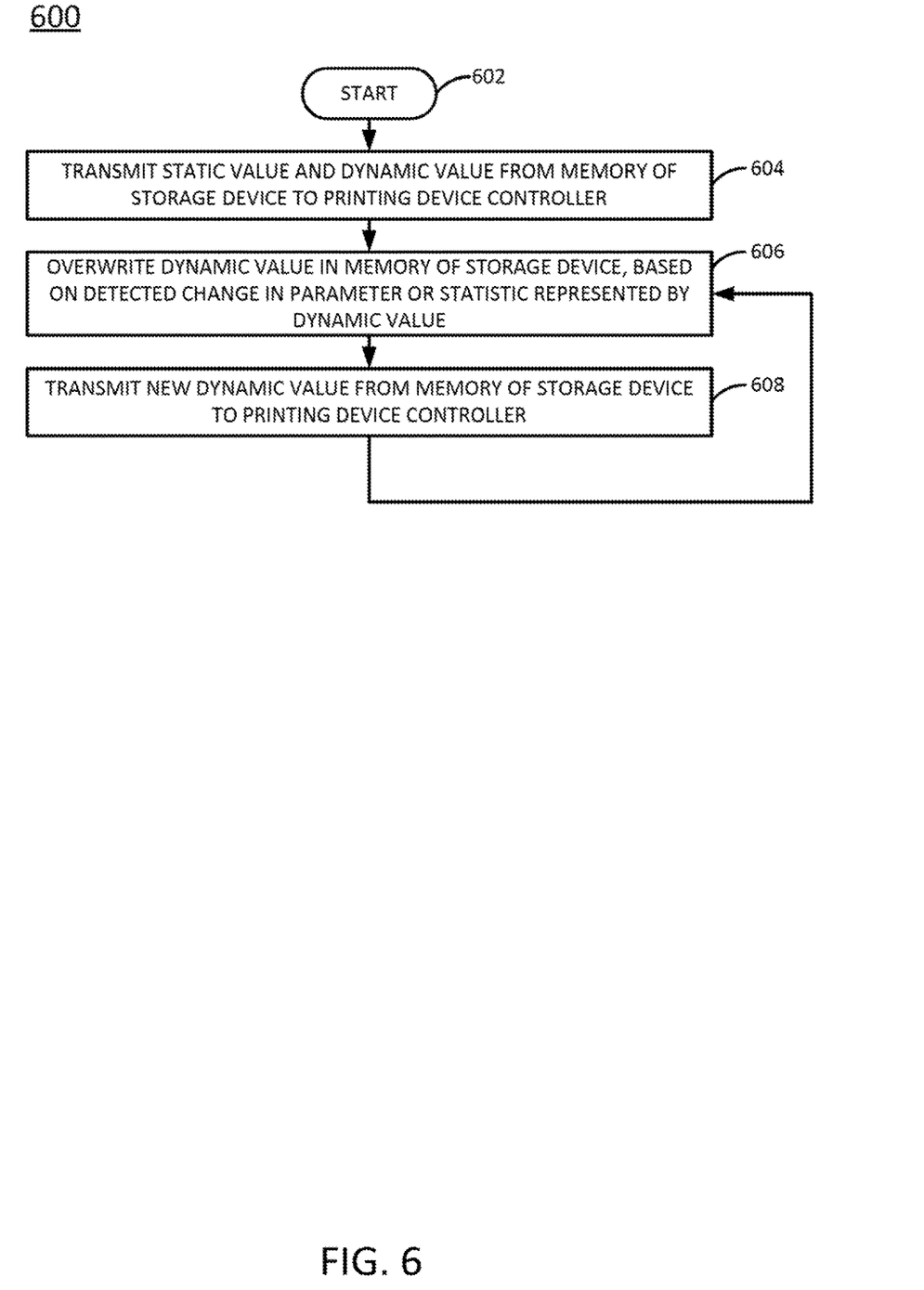
FIG. 6 illustrates a flow diagram of an example method for monitoring a state of a consumable in a printing device.

FIG. 6 illustrates a flow diagram of an example method 600 for monitoring a state of a consumable in a printing device. The method 600 may be performed, for example, by the processor 402 configured as illustrated in FIG. 4 and/or by various other components of the storage device 400. As such, reference may be made in the discussion of the method 600 to a processor; however, such references are made for the sake of example, and are not intended to be limiting.

The method 600 begins in block 602. In block 604, a static value and a dynamic value stored in a memory (e.g., a ROM or a flash memory) of a storage device that is mounted on a consumable is transmitted to a controller of a printing device in which the consumable is installed. In one example, the static value relates to a security policy or contract attached to the consumable. For instance, the static value may define a threshold level of depletion that the consumable should reach before it is unlocked, a range of times during which the consumable may be unlocked, or another value. In one example, the dynamic value relates to a current state of the consumable. For instance, the dynamic value may define usage statistics for the consumable, such as the consumable's current level of depletion, the consumable's remaining life, the veracity of the consumable's origin, the number of times consumable has been inserted in a printing device, the number of pages printed using the consumable, level of depletion the last time the consumable was removed from a printing device (e.g., if the consumable is reusable), and/or other statistics. In one example, transmission of the static value and the dynamic value to the controller of the printing device involves transmitting the static value and the dynamic value over a set of contacts as an electrical current having a particular contact resistance.

In block 606, the dynamic value is overwritten in the memory of the storage device with a new dynamic value. In one example, the dynamic value is overwritten when a change is detected in the parameter or statistic that the dynamic value represents. For instance, if the dynamic value represents the consumable's current level of depletion, then the dynamic value may be overwritten each time the depletion level of the consumable is detected to reach some interval of depletion (e.g., every x percent depleted).

In block 608, the new dynamic value is transmitted to the controller of the printing device. In one example, transmission of the new dynamic value to the controller of the printing device involves transmitting the new dynamic value over a set of contacts as an electrical current having a particular contact resistance, as in block 604. The method 600 then returns to block 606 and proceeds as described above until the consumable reaches a state where the controller of the printing device unlocks it, and the consumable can be removed from the printing device.

It should also be noted that although not explicitly specified, some of the blocks, functions, or operations of the method 500 and 600 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 5-6 that recite a determining operation, or involve a decision, do not imply that both branches of the determining operation are practiced. In other words, one of the branches of the determining operation may not be performed, depending on the results of the determining operation.

Figure 7:
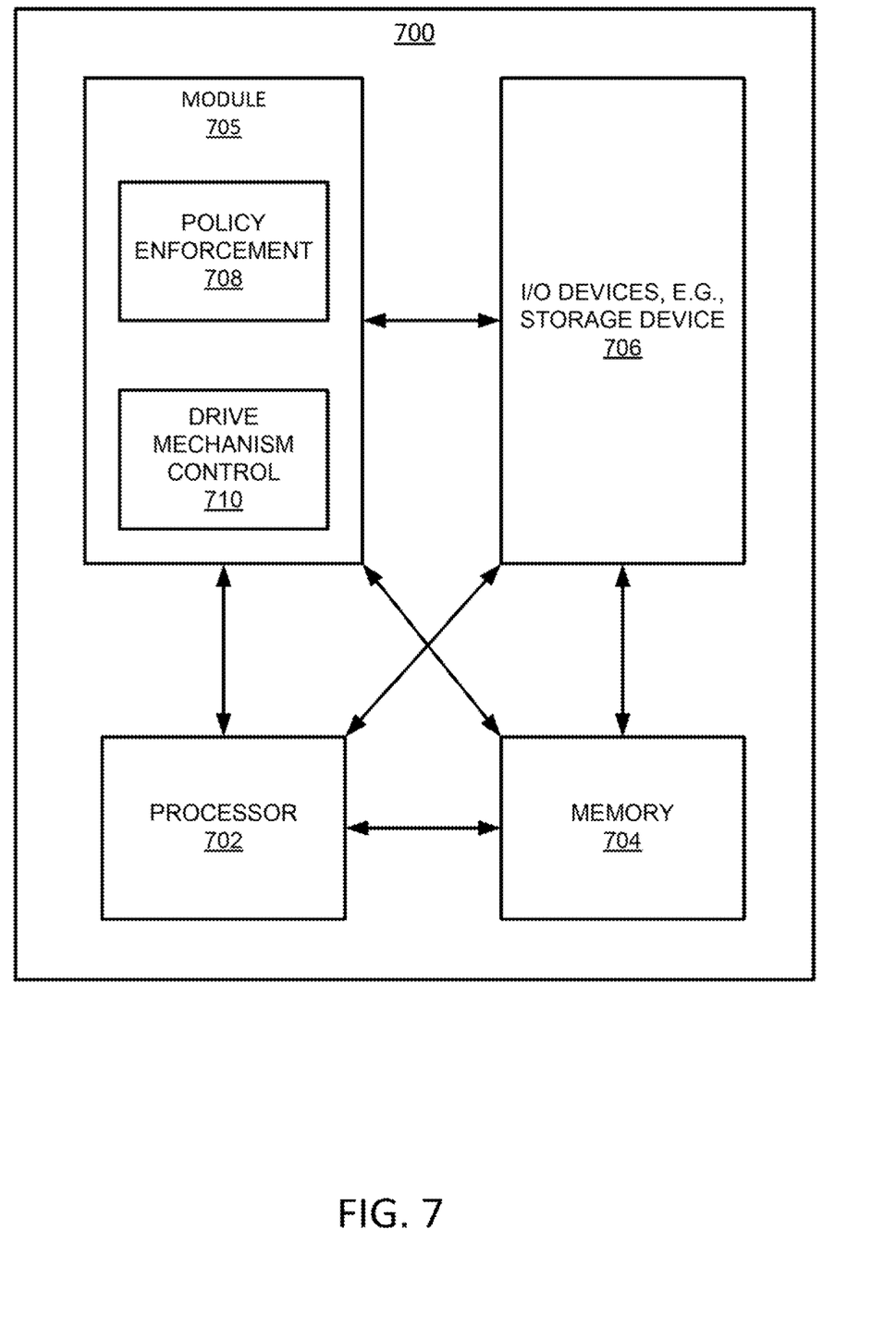
FIG. 7 depicts a high-level block diagram of an example computer that can be transformed into a machine capable of performing the functions described herein.

FIG. 7 depicts a high-level block diagram of an example computer 700 that can be transformed into a machine capable of performing the functions described herein. Notably, no computer or machine currently exists that performs the functions as described herein. As a result, the examples of the present disclosure modify the operation and functioning of the general-purpose computer to lock a consumable in a printing device, as disclosed herein.

As depicted in FIG. 7, the computer 700 comprises a hardware processor element 702, e.g., a central processing unit (CPU), a microprocessor, or a multi-core processor, a memory 704, e.g., random access memory (RAM) and/or read only memory (ROM), a module 705 for locking a consumable in a printing device, and various input/output devices 706, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 705 for locking a consumable in a printing device, e.g., machine readable instructions can be loaded into memory 704 and executed by hardware processor element 702 to implement the blocks, functions or operations as discussed above in connection with the method 500. For instance, the module 705 may include a plurality of programming code components, including a policy enforcement component 708 and a drive mechanism control component 710.

The policy enforcement component 708 may be configured to enforce a user (e.g., customer, CSP, or manufacturer) policy regarding usage of consumables. For instance, the policy may dictate how much of a consumable should be depleted before the consumable can be replaced, the make or model of consumable that should be used in a printing device, or other consumable-related policies as discussed above. The policy enforcement component 708 may be in communication with a storage device on the consumable, or may monitor the state of the consumable in some other way in order to determine when actions should be taken to enforce a policy.

The drive mechanism control component 710 may be configured to control an actuator (e.g., motor) that causes movement of a drive mechanism that engages a consumable. For instance, the drive mechanism control component 710 may control a motor that rotates the drive mechanism in a specific direction to lock or unlock a consumable, consistent with a policy enforced by the policy enforcement component 708.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 705 for locking a consumable in a printing device, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
   extracting a static value and a dynamic value from a computer readable storage device mounted on a consumable that is locked in a printing device;
   determining, based at least in part on a comparison of the static value to the dynamic value, that the consumable should be unlocked to facilitate removal of the consumable from the printing device; and
   sending a signal to a drive mechanism of the printing device which is engaged with a delivery auger inside the consumable, the signal instructing the drive mechanism to rotate so that a key that is integrated in the drive mechanism releases a locking mechanism that is integrated in a mechanical drive coupling of the consumable thereby unlocking the consumable.

2. The method of claim 1, wherein the static value relates to a security policy that is specific to a user of the printing device.

3. The method of claim 2, wherein the static value indicates a threshold level of depletion that the consumable should reach before it is unlocked.

4. The method of claim 2, wherein the dynamic value relates to a current usage state of the consumable.

5. The method of claim 4, wherein the dynamic value indicates a current level of depletion of the consumable.

6. The method of claim 1, wherein the key comprises a pin, and the locking mechanism comprises a spiral-shaped ramp cut into the mechanical drive coupling of the consumable.

7. The method of claim 1, wherein the key comprises a threaded shaft, and the locking mechanism comprises a threaded bore on the mechanical drive coupling of the consumable.

8. The method of claim 1, wherein the consumable is a toner cartridge.

9. The method of claim 1, wherein the drive mechanism comprises a component of the printing device that extracts contents of the consumable and drives delivery of the contents to portions of the printing device.

10. The method of claim 1, wherein the drive mechanism includes a sensor to detect engagement of the key with the locking mechanism.

11. The method of claim 1, wherein the computer readable storage device further stores an indication of a veracity of an origin of the consumable.

12. The method of claim 1, wherein the computer readable storage device further stores an indication of a number of times the consumable has been inserted in a printing device.

13. A method, comprising:
   detecting that a key integrated in a drive mechanism of a printing device has at least partially engaged a locking mechanism integrated in mechanical drive coupling of a consumable that a user is attempting to install in the printing device; and
   sending a signal to the drive mechanism to rotate so that the drive mechanism engages a delivery auger inside the consumable and the key fully engages the locking mechanism to lock the consumable in the printing device.

14. The method of claim 13, further comprising:
   detecting that the consumable has reached a threshold level of depletion; and
   sending a signal to the drive mechanism to unlock the consumable from the printing device.

15. The method of claim 13, wherein the consumable is a toner cartridge.

16. The method of claim 13, wherein the drive mechanism comprises a component of the printing device that extracts contents of the consumable and drives delivery of the contents to portions of the printing device.

17. The method of claim 16, wherein further rotation of the drive mechanism after the consumable has been locked in the printing device causes the drive mechanism to deliver contents of the consumable to the portions of the printing system.

18. The method of claim 13, wherein the detecting is performed by a sensor of the drive mechanism.

19. A method, comprising:
   detecting that a key integrated in a delivery auger drive mechanism of printing device has failed to engage a locking mechanism integrated in a mechanical drive coupling of a consumable that a user is attempting to install in the printing device; and sending an alert to an output device of the printing device to notify the user to re-attempt installation of the consumable.

20. The method of claim 19, wherein the consumable is a toner cartridge.

* * * * *